United States Patent [19]

Kim et al.

[11] Patent Number: 5,378,667
[45] Date of Patent: Jan. 3, 1995

[54] INTERCRYSTALLINE SEMICONDUCTIVE CERAMIC CAPACITOR

[75] Inventors: Yoon H. Kim; Tae S. Oh; Byeong C. Lee, all of Seoul, Rep. of Korea

[73] Assignee: Korea Institute of Science and Technology, Seoul, Rep. of Korea

[21] Appl. No.: 165,294

[22] Filed: Dec. 10, 1993

[51] Int. Cl.[6] .............................................. C04B 35/46
[52] U.S. Cl. .................................................. 501/136
[58] Field of Search ........................................ 501/136

[56] References Cited

U.S. PATENT DOCUMENTS

| | | |
|---|---|---|
| 4,721,692 | 1/1988 | Nishioka et al. ............... 501/136 |
| 4,781,859 | 11/1988 | Noi .............................. 501/136 |
| 4,799,127 | 1/1989 | Ono et al. ..................... 501/136 |
| 4,839,097 | 6/1989 | Noi et al. ...................... 501/136 |
| 4,897,219 | 1/1990 | Noi et al. ...................... 501/136 |
| 4,987,107 | 1/1991 | Narumi et al. ................. 501/136 |
| 4,992,399 | 2/1991 | Kumagai et al. ............... 501/136 |
| 5,006,957 | 4/1991 | Kumagai et al. ............... 501/136 |
| 5,075,818 | 12/1991 | Ueno et al. .................... 501/136 |
| 5,166,759 | 11/1992 | Ueno et al. .................... 501/136 |

FOREIGN PATENT DOCUMENTS

| | | | |
|---|---|---|---|
| 0070540 | 1/1983 | European Pat. Off. ............ 501/136 |
| 0107803 | 6/1985 | Japan ............................. 501/136 |
| 0107804 | 6/1985 | Japan ............................. 501/136 |
| 0250602 | 12/1985 | Japan ............................. 501/136 |

Primary Examiner—Mark L. Bell
Assistant Examiner—Deborah Jones
Attorney, Agent, or Firm—Darby & Darby

[57] ABSTRACT

An intercrystalline semiconductive ceramic capacitor having a dielectric ceramic body formed by sintering a dielectric ceramic having a composition essentially consisting of a major component comprised of 1 mole $SrTiO_3$ and a minor component comprised of 0.01 to 0.04 mole $TiO_2$, 0.001 to 0.010 mole $Dy_2O_3$, 0.001 to 0.007 mole ZnO, 0.002 to 0.012 mole $MnO_2$ and 0.01 to 0.07 mole $Al_2O_3$ at a temperature of 1,400° to 1,470° C. in a reducing atmosphere, an intercrystalline insulation layer formed by coating an insulation paste over both surfaces of the dielectric ceramic body and heat treating the resultant body, and external electrodes formed on the both surface of the dielectric ceramic body, respectively.

2 Claims, 1 Drawing Sheet

INTERCRYSTALLINE SEMICONDUCTIVE CERAMIC CAPACITOR

BACKGROUND OF THE INVENTION

1. Field of the Invention

The present invention relates to an intercrystalline semiconductive ceramic capacitor having an intercrystalline insulation layer among semiconductive crystal grains of a multicrystalline structure mainly consisting of $SrTiO_3$, and more particularly to an intercrystalline semiconductive ceramic capacitor made by sintering a composition containing $TiO_2$, $Dy_2O_3$, ZnO, $MnO_2$ and $Al_2O_3$ in a small amount as its minor component in a reducing atmosphere to achieve a tightness of microstructure and a promotion of a crystal growth, thereby exhibiting a superior electrical characteristic.

2. Description of the Prior Art

Intercrystalline semiconductive ceramic capacitors containing $BaTiO_3$ or $SrTiO_3$ as a major component have, as a dielectric layer, a thin intercrystalline insulation layer formed among semiconductive crystal grains. By this layer, such ceramic capacitors exhibit a high apparent dielectric constant, as compared with general ceramic capacitors. This high apparent dielectric constant provides advantages of a compactness and a high capacity.

Among intercrystalline semiconductive ceramic capacitors, $SrTiO_3$-based ceramic capacitors are known as exhibiting a low dielectric loss (tan δ) and a superior temperature dependency of dielectric constant at a room temperature over $BaTiO_3$-based ceramic capacitors, because they contain $SFTiO_3$ as a major component.

As a composition for such $SrTiO_3$-based ceramic capacitors, there has been known a composition essentially consisting of $SrTiO_3$ added with $Nb_2O_5$ and $SiO_2$ in a small amount. The $SrTiO_3$-based ceramic capacitors can be manufactured by sintering the dielectric ceramic in a reducing atmosphere, diffusing an insulation material comprised of a metal oxide such as PbO, $Bi_2O_3$, $B_2O_3$ or CuO in crystal grain boundaries of the semiconductive ceramic and thereby forming an intercrystalline insulation layer.

However, this conventional intercrystalline semiconductive ceramic composition exhibits a dielectric constant of about 40,000. As a result, intercrystalline semiconductive ceramic capacitors made of such a composition has a limited capacitance per area. By such a limited capacitance, the ceramic capacitors can not achieve a compactness.

SUMMARY OF THE INVENTION

Therefore, an object of the invention is to solve a problem of a low dielectric constant encountered in the conventional $SrTiO_3$-based intercrystalline semiconductive ceramic capacitor composition and to provide an intercrystalline semiconductive ceramic capacitor composition containing $TiO_2$, $Dy_2O_3$, ZnO, $MnO_2$ and $Al_2O_3$ as its minor component, thereby capable of obtaining a high dielectric constant.

Another object of the invention is to provide an intercrystalline semiconductive capacitor having an intercrystalline insulation layer obtained by sintering an intercrystalline semiconductive ceramic capacitor composition containing $TiO_2$, $Dy_2O_3$, ZnO, $MnO_2$ and $Al_2O_3$ as its minor component to produce a dielectric ceramic body having semiconductive crystal grains, coating both surfaces of the dielectric ceramic body, and heat treating the semiconductive dielectric ceramic body.

In accordance with one aspect, the present invention provides an intercrystalline semiconductive ceramic capacitor composition essentially consisting of a major component comprised of 1 mole $SrTiO_3$ and a minor component comprised of 0.01 to 0.04 mole $TiO_2$, 0.001 to 0.010 mole $Dy_2O_3$, 0.001 0.007 mole ZnO, 0.002 to 0.012 mole $MnO_2$ and 0.01 to 0.07 mole $Al_2O_3$.

In accordance with another aspect, an intercrystalline semiconductive ceramic capacitor comprising: a dielectric ceramic body formed by sintering a dielectric ceramic having a composition essentially consisting of a major component comprised of 1 mole $SrTiO_3$ and a minor component comprised of 0.01 to 0.04 mole $TiO_2$, 0.001 to 0.010 mole $Dy_2O_3$, 0.001 to 0.007 mole ZnO, 0.002 to 0.012 mole $MnO_2$ and 0.01 to 0.07 mole $Al_2O_3$ at a temperature of 1,400° to 1,470° C. in a reducing atmosphere; an intercrystalline insulation layer formed by coating an insulation paste over both surfaces of the dielectric ceramic body and heat treating the resultant body; and external electrodes formed on the both surface of the dielectric ceramic body, respectively.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

In accordance with the present invention, there is provided an intercrystalline semiconductive ceramic capacitor composition essentially consisting of 1 mole $SrTiO_3$ as a major component, 0.01 to 0.04 mole $TiO_2$, 0.001 to 0.010 mole $Dy_2O_3$, 0.001 to 0.007 mole ZnO, 0.002 to 0.012 mole $MnO_2$ and 0.01 to 0.07 mole $Al_2O_3$ as minor components.

When this composition is sintered in a reducing atmosphere so as to produce a $SrTiO_3$ dielectric ceramic body, a liquid phase is formed in crystal boundaries of the dielectric ceramic body. This liquid phase serves to promote a tightness and a crystal growth of a microstructure, increase an electric conductivity and improve the electric insulation property.

For manufacturing a ceramic capacitor by using the intercrystalline semiconductive ceramic capacitor composition, the elements of the composition are well mixed and then the mixture is sintered at a temperature of 1,400° to 1,470° C. in a reducing atmosphere. By the sintering, a dielectric ceramic body having semiconductive crystal grains is produced.

Thereafter, an insulation paste is coated over both surfaces of the semiconductive dielectric ceramic body. The insulation paste is comprised of an insulation material such as PbO, $Bi_2O_3$, $B_2O_3$ or CuO. The dielectric ceramic body is then heat treated at a temperature 1,100° to 1,300° C. so that the insulation material is selectively diffused in crystal boundaries in the dielectric ceramic body, thereby forming an intercrystalline insulation layer.

Subsequently, external electrodes are formed at both surfaces of the sintered dielectric ceramic body having the intercrystalline insulation layer, respectively. Thus an intercrystalline semiconductive ceramic capacitor is obtained.

Figure 1:
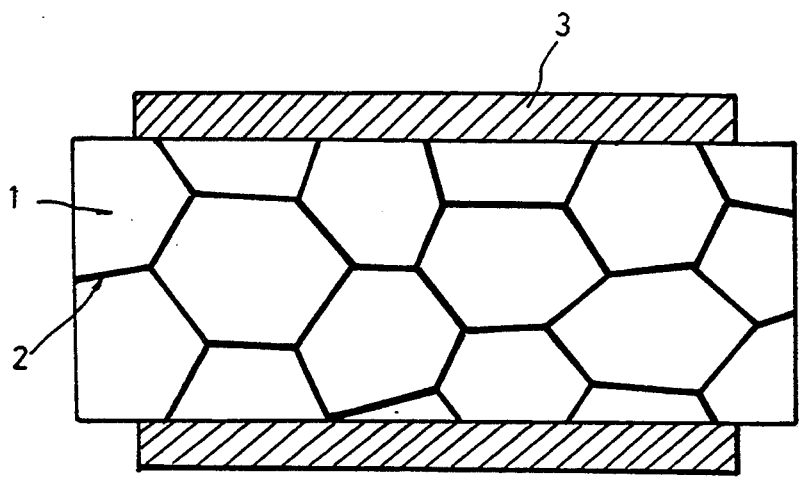
FIG. 1 is a sectional view of a structure of the intercrystalline semiconductive ceramic capacitor in accordance with the present invention.

FIG. 1 is a sectional view of a structure of the intercrystalline semiconductive ceramic capacitor manufactured using the above-mentioned ceramic capacitor composition in accordance with the present invention. As shown in FIG. 1, the structure includes multicrystalline semiconductive dielectric ceramic crystal grains 1, an intercrystalline insulation layer 2 formed by a diffusion of an insulation material in grain boundaries of the crystal grains 1, and external electrodes 3 formed at both surfaces of a sintered body constituted by the crystal grains 1 and the intercrystalline insulation layer 2.

The intercrystalline semiconductive ceramic capacitor in accordance with the present invention exhibits excellent electrical characteristics of a dielectric constant of no less than 50,000, a dielectric loss (tan δ) of no more than 1.5% and a specific resistance of no less than 10GΩ·cm.

The present invention will be understood more readily with reference to the following examples; however these examples are intended to illustrate the invention and are not to be construed to limit the scope of the present invention.

EXAMPLES

In accordance with each of the examples shown in TABLE 1, a mixture of $SrCO_3$ and $TiO_3$ both having the purity of 99% was prepared. The mixture was then subjected to a calcination at a temperature of 1,130° C. for two hours, thereby producing a $SrTiO_3$ composition. This composition was then added with a minor component including selected elements of $TiO_2$, $Dy_2O_3$, ZnO, $MnO_2$ and $Al_2O_3$ having the composition of TABLE 1 based on 1 mole of $SrTiO_3$. The resultant mixture was wet blended and then milled, thereby obtaining ceramic powder.

The ceramic powder was compacted to produce a disc body having a thickness of 1 mm. Subsequently, the disc body is sintered at a temperature of 1,450° C. for two hours in a reducing atmosphere consisting of a mixed gas of nitrogen and hydrogen ($N_2:H_2 = 10:1$, volume ratio) so as to obtain a semiconductive dielectric ceramic sample.

The sintering in the reducing atmosphere used a heating rate of 300° C./hr and a cooling rate of 200° C./hr in a temperature range from the sintering temperature to 1,000° C. A furnace cooling was carried out in a temperature range of less than 1,000° C.

Alternatively, the ceramic powder might be produced by adding the minor component having the composition of TABLE 1 to the major component including 1 mole $SrCO_3$ and 1 mole $TiO_2$ both having the purity of 99%, wet blending the resultant mixture, and then subjecting it to a calcination at 1,130° C. for two hours in the atmosphere.

The semiconductive dielectric ceramic sample obtained by the sintering in the reducing atmosphere was coated at its both surface with an insulation paste consisting of PbO, $Bi_2O_3$ and $B_2O_3$ having a weight % ratio of 50:45:5 by utilizing a screen printing. The resultant sample was then heat treated at 1,200° C. in the atmosphere, so that it has an electric insulation layer formed among semiconductive crystal grains thereof.

A silver electrode paste was screen printed on both surfaces of the sample subjected to the intercrystalline insulation treatment. The resultant sample was then subjected to a heat treatment at a temperature of 800° C. for 10 minutes in the atmosphere, so that it has external electrodes respectively formed the both surfaces. The sample was then subjected to a test for evaluating the dielectric constant(s) and the dielectric loss (tan δ) at the frequency of 1 KHz, and the specific resistance ($\rho$) at the DC voltage of 25 V. The results were given in TABLE 1.

TABLE 1

Composition and Characteristic of intercrystalline semiconductive ceramic capacitor materials

| Sample Nos. | Composition (mol.) | | | | | | $\epsilon$*1) | tanδ*2) | $\rho$*3) |
|---|---|---|---|---|---|---|---|---|---|
| | $SrTiO_3$ | $TiO_2$ | $Dy_2O_3$ | ZnO | $MnO_2$ | $Al_2O_3$ | | | |
| 1 | 1 | 0.01 | 0.002 | 0.001 | — | — | 72,000 | 3.5 | 0.02 |
| 2 | 1 | 0.01 | 0.004 | 0.001 | — | — | 110,000 | 5.0 | 0.01 |
| 3 | 1 | 0.01 | 0.002 | 0.001 | 0.005 | — | 25,000 | 2.5 | 50.0 |
| 4 | 1 | 0.01 | 0.002 | 0.001 | 0.005 | 0.01 | 58,000 | 1.2 | 30.0 |
| 5 | 1 | 0.01 | 0.002 | 0.001 | 0.005 | 0.02 | 75,000 | 1.0 | 30.0 |
| 6 | 1 | 0.01 | 0.002 | 0.001 | 0.005 | 0.03 | 100,000 | 0.8 | 15.0 |
| 7 | 1 | 0.01 | 0.003 | 0.001 | 0.005 | 0.03 | 95,000 | 1.0 | 20.0 |
| 8 | 1 | 0.01 | 0.002 | 0.001 | 0.005 | 0.04 | 120,000 | 1.1 | 15.0 |
| 9 | 1 | 0.01 | 0.002 | 0.001 | 0.005 | 0.05 | 68,000 | 1.0 | 25.0 |
| 10 | 1 | 0.01 | 0.005 | 0.001 | 0.005 | 0.05 | 59,000 | 1.2 | 30.0 |
| 11 | 1 | 0.01 | 0.002 | 0.001 | 0.005 | 0.07 | 51,000 | 1.5 | 30.0 |
| 12 | 1 | 0.01 | 0.002 | 0.001 | 0.005 | 0.10 | 28,000 | 0.9 | 50.0 |
| 13 | 1 | 0.01 | 0.001 | 0.001 | 0.005 | 0.04 | 95,000 | 1.5 | 10.0 |
| 14 | 1 | 0.01 | 0.003 | 0.001 | 0.005 | 0.04 | 120,000 | 0.9 | 15.0 |
| 15 | 1 | 0.01 | 0.004 | 0.001 | 0.005 | 0.04 | 110,000 | 0.9 | 20.0 |
| 16 | 1 | 0.01 | 0.005 | 0.001 | 0.005 | 0.03 | 87,000 | 1.3 | 25.0 |
| 17 | 1 | 0.01 | 0.005 | 0.001 | 0.005 | 0.04 | 90,000 | 1.0 | 30.0 |
| 18 | 1 | 0.01 | 0.010 | 0.001 | 0.005 | 0.04 | 55,000 | 0.8 | 15.0 |
| 19 | 1 | 0.01 | 0.015 | 0.001 | 0.005 | 0.04 | 22,500 | 1.5 | 20.0 |
| 20 | 1 | 0.01 | 0.002 | 0.005 | 0.005 | 0.03 | 87,000 | 1.2 | 15.0 |
| 21 | 1 | 0.01 | 0.002 | 0.005 | 0.005 | 0.04 | 92,000 | 1.1 | 20.0 |
| 22 | 1 | 0.01 | 0.004 | 0.005 | 0.005 | 0.04 | 88,500 | 1.0 | 15.0 |
| 23 | 1 | 0.01 | 0.003 | 0.007 | 0.005 | 0.04 | 90,000 | 1.0 | 20.0 |
| 24 | 1 | 0.01 | 0.004 | 0.007 | 0.005 | 0.04 | 84,900 | 0.9 | 15.0 |
| 25 | 1 | 0.01 | 0.004 | 0.007 | 0.005 | 0.05 | 61,000 | 1.2 | 30.0 |
| 26 | 1 | 0.01 | 0.004 | 0.010 | 0.005 | 0.04 | 430 | 0.9 | 450.0 |
| 27 | 1 | 0.02 | 0.004 | 0.001 | 0.005 | 0.04 | 84,000 | 1.2 | 20.0 |

TABLE 1-continued

Composition and Characteristic of intercrystalline semiconductive ceramic capacitor materials

| Sample Nos. | Composition (mol.) | | | | | | $\epsilon^{*1)}$ | $\tan\delta^{*2)}$ | $\rho^{*3)}$ |
| --- | --- | --- | --- | --- | --- | --- | --- | --- | --- |
| | SrTiO$_3$ | TiO$_2$ | Dy$_2$O$_3$ | ZnO | MnO$_2$ | Al$_2$O$_3$ | | | |
| 28 | 1 | 0.02 | 0.002 | 0.005 | 0.005 | 0.03 | 87,000 | 0.9 | 25.0 |
| 29 | 1 | 0.02 | 0.003 | 0.007 | 0.005 | 0.04 | 82,000 | 1.2 | 25.0 |
| 30 | 1 | 0.03 | 0.004 | 0.001 | 0.005 | 0.04 | 54,000 | 1.5 | 35.0 |
| 31 | 1 | 0.04 | 0.004 | 0.001 | 0.005 | 0.04 | 25,500 | 1.1 | 50.0 |
| 32 | 1 | 0.01 | 0.004 | 0.001 | 0.002 | 0.04 | 75,000 | 1.5 | 15.0 |
| 33 | 1 | 0.02 | 0.003 | 0.007 | 0.002 | 0.03 | 53,000 | 1.2 | 30.0 |
| 34 | 1 | 0.01 | 0.004 | 0.001 | 0.007 | 0.04 | 84,300 | 1.1 | 20.0 |
| 35 | 1 | 0.01 | 0.004 | 0.001 | 0.009 | 0.04 | 81,200 | 0.8 | 20.0 |
| 36 | 1 | 0.01 | 0.004 | 0.001 | 0.012 | 0.04 | 53,000 | 0.9 | 20.0 |
| 37 | 1 | 0.01 | 0.004 | 0.001 | 0.015 | 0.04 | 350 | 0.6 | 450.0 |

$\epsilon^{*1)}$: dielectric constant;
$\tan\delta^{*2)}$: dielectric loss(%); and
$\rho^{*3)}$: specific resistance Among the samples shown in TABLE 1, the sample Nos. 1 to 3 and the sample No. 37 represent comparative samples each having a composition beyond a semiconductive ceramic capacitor composition range of the present invention. The other sample Nos. represent samples of the present invention. The samples of the present invention, namely, the samples 4 to 36 exhibited a dielectric constant of no less than 50,000, a dielectric loss of no more than 1.5% and a specific resistance of no less than 10GΩ·cm.

However, the comparative samples beyond the composition range of the present invention did not, exhibit the electrical characteristics as those of the samples of the present, invention.

Figure 2:
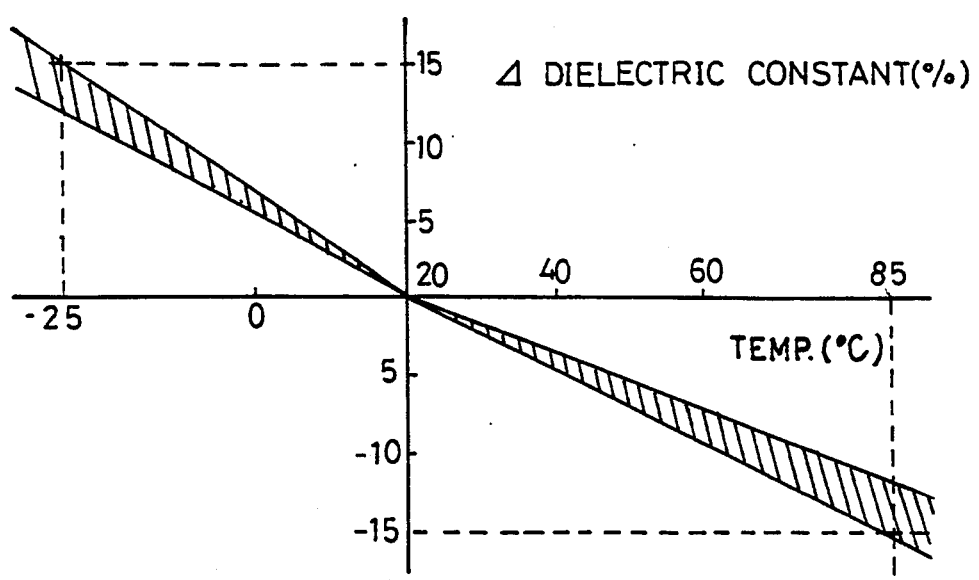
FIG. 2 is a graph showing a variation in dielectric constant of the intercrystalline semiconductive ceramic capacitor of the present Invention depending on a variation in temperature.

As apparent from a graph of FIG. 2 showing a variation in dielectric constant depending on a variation in temperature, each composition of the present invention exhibited an excellent dielectric constant variation characteristic in a temperature range from −25° to 85° C. Tile variation rate of the dielectric constant was not more than 15%.

In particular, the samples 6 to 8, 13 to 15, 20 to 24, 27 to 29, 34 and 35 in a composition range of 1 mole SrTiO$_3$, 0.01 to 0.02 mole TiO$_2$, 0.002 to 0.004 mole Dy$_2$O$_3$, 0.001 to 0.007 mole ZnO, 0.005 to 0.009 mole MnO$_2$ and 0.03 to 0.04 mole Al$_2$O$_3$ exhibited excellent electrical characteristics, namely, a dielectric constant of no less than 80,000 and a specific resistance of no less than 10GΩ·cm.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A composition for an intercrystalline semiconductive ceramic capacitor essentially consisting of a major component comprised of 1 mole SrTiO$_3$ and a minor component comprised of 0.01 to 0.04 mole TiO$_2$, 0.001 to 0.010 mole Dy$_2$O$_3$, 0.001 to 0.007 mole ZnO, 0.002 to 0.012 mole MnO$_2$ and 0.01 to 0.07 mole Al$_2$O$_3$.

2. A composition in accordance with claim 1, wherein said minor component is comprised of 0.01 to 0.02 mole TiO$_2$, 0.002 to 0.005 mole Dy$_2$O$_3$, 0.001 to 0.007 mole ZnO, 0.005 to 0.009 mole MnO$_2$ and 0.03 to 0.04 mole Al$_2$O$_3$.

* * * * *